Patented Jan. 6, 1931

1,788,300

UNITED STATES PATENT OFFICE

JOHANN HUISMANN AND HUGO SCHWEITZER, OF WIESDORF-ON-THE-RHINE, AND RICHARD STÜSSER, OF COLOGNE-DEUTZ, GERMANY, ASSIGNORS TO GENERAL ANILINE WORKS, INC., OF NEW YORK, N. Y., A CORPORATION OF DELAWARE

NEW AZO DYES

No Drawing. Application filed June 25, 1928, Serial No. 288,286, and in Germany July 4, 1927.

The present invention concerns new and valuable azo dyestuffs of the general formula:

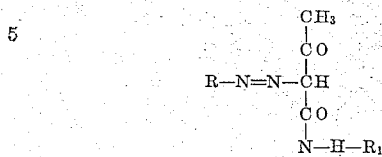

wherein R represents an aromatic nucleus which is substituted by a nitro group in ortho position to the azo group and which may be further substituted by any substituent with the exception of a sulfo group and $R_1$ an aromatic nucleus which is substituted by a sulfo group and which may be further substituted by any substituent.

In accordance with the present invention an o-nitro-benzene-azo-aceto-acetic acid chloride dyestuff is caused to interact with an arylamine sulfonic acid or a nuclear substitution product thereof, preferably previously dissolved in a suitable solvent, such as for example, pyridine, or quinoline, which at the same time serve for neutralizing the hydrochloric acid liberated during the reaction. Thus are obtained monoazo dyestuffs, sulfonated in the acetoacetic arylide residue and therefore soluble in water. These dyestuffs when precipitated as lakes and used as size colors yield deep and remarkably clear yellow to orange shades, which are fast to light and water. Our new products are moreover distinguished by the fact that they dye wool in very clear and even shades, remarkably fast to fulling and light.

Our new dyestuffs, after being dried and pulverized, are generally in the form of their alkali metal salts yellow to orange powders soluble in water and sulfuric acid with a yellow coloration, difficultly soluble or insoluble in organic solvents. The color lakes prepared from them are distinguished by full yellow shades, clearness and fastness to light. The new products dye wool evenly clear yellow shades of superior fastness to light and fulling.

The following examples will illustrate our invention, without limiting it thereto:

*Example 1.*—304 parts by weight of the chloride produced from the dyestuff 4-chloro-2-nitro-benzene-1-azo-acetoacetic acid (F. P. 154° C.) are dissolved in about 15 times the weight of chlorobenzene with gentle heating. The solution is cooled again to about 30° C. and a solution of 203 parts by weight of 2-anisidine-4-sulfonic acid in about 15 times the weight of pyridine is run in with thorough stirring also at 30° C. The temperature of the reaction mixture rises about 5° C. The dyesuff begins to separate soon and after some time can be separated from the liquor by filtration. It is treated with steam, preferably in a suspension of sodium carbonate and is thus freed from any still adhering pyridine and chlorobenzene. As the aqueous solution cools the new product crystallizes in yellow crystals having in its free state the probable formula:

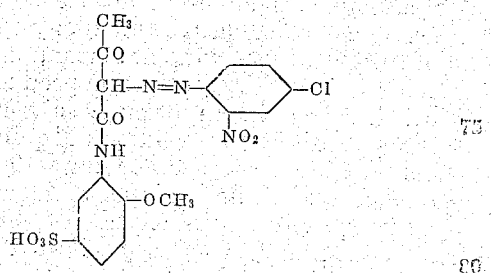

when dissolved and precipitated in the customary manner on a substratum the dyestuff yields a clear yellow pigment lake, which when used as a size color exhibits an excellent fastness to water and light. The dyestuff is also of interest in wool dyeing, since it dyes wool very evenly in yellow shades, fast to fulling and very fast to light.

*Example 2.*—207.5 parts by weight of 4-chloro-aniline-3-sulfonic acid are dissolved at about 50° C., in 20 times the weight of pyridine. A solution of 283.5 parts by weight of the dyestuff 2-nitro-4-toluene-1-azoacetic acid chloride (F. P. 157° C.) in 4200 parts by weight of chlorobenzene is caused to run into this solution with thorough stirring at a temperature of 30° C. The condensation product begins to separate immediately and can be separated from the cooled reaction mixture by filtering. When freed from adhering pyridine and chlorobenzene by means of steam in aqueous suspension, rendered alkaline with sodium carbonate, the dyestuff crystallizes in greenish yellow crystals. The dyestuff has in its free state the probable formula:

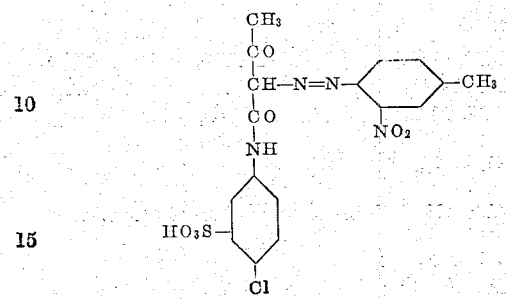

The pigment lake produced from the same possesses a clear greenish yellow shade and when used as size color possesses an excellent fastness to water and very satisfactory fastness to light. The dyestuff dyes wool very even greenish yellow shades of satisfactory fastness to light and fulling.

We claim:

1. In the process of preparing water-soluble mono-azo-dyestuffs, the step which comprises reacting with an o-nitro-benzene-azo-aceto-acetic acid chloride dyestuff upon a compound of the group consisting of arylamino sulfonic acids and nuclear substitution products thereof.

2. In the process of preparing water-soluble mono-azo-dyestuffs, the step which comprises reacting with an o-nitro-benzene-azo-aceto-acetic acid chloride dyestuff upon a compound of the group consisting of arylamino sulfonic acids and nuclear substitution products thereof, dissolved in an organic solvent of the group consisting of pyridine and quinoline.

3. In the process of preparing water-soluble mono-azo-dyestuffs, the step which comprises reacting with one molecule of 4-chloro-2-nitro-benzene-1-azo-aceto-acetic acid chloride dyestuff upon one molecule of 2-anisidine-4-sulfonic acid.

4. In the process of preparing water-soluble mono-azo-dyestuffs, the step which comprises reacting with one molecule of 4-chloro-2-nitro-benzene-1-azo-aceto-acetic acid chloride dyestuff upon one molecule of 2-anisidine-4-sulfonic acid, dissolved in pyridine at a temperature of about 30° C.

5. As new products water soluble monoazo dyestuffs having most probably the formula:

$$R-N=N-\underset{\underset{\underset{R_1}{NH}}{CO}}{\overset{\overset{CH_3}{CO}}{CH}}$$

wherein R represents an aromatic nucleus which is substituted by a nitro group in ortho-position to the azo group and which may be further substituted by any substituent with the exception of a sulfo group and $R_1$ an aromatic nucleus which is substituted by a sulfo group and which may be further substituted by any substituent, and being in the form of the alkali metal salts yellow to orange powders, exhibiting various yellow shades of outstanding clearness and fastness to light and water as size colors and dyeing wool clear yellow shades of superior fastness to light and fulling.

6. As a new product, the water soluble mono-azo-dyestuff having in its free state most probably the following formula:

being in form of its sodium salt a light yellow powder exhibiting as a size color a yellow shade of outstanding clearness and fastness to light and water and dyeing wool clear yellow shades of good fastness to light and fulling.

In testimony whereof we have hereunto set our hands.

JOHANN HUISMANN. [L. S.]
HUGO SCHWEITZER. [L. S.]
RICHARD STÜSSER. [L. S.]